April 28, 1925.
H. G. LANE
GATE
Filed July 6, 1920
1,535,320
3 Sheets-Sheet 3
Fig. 3.
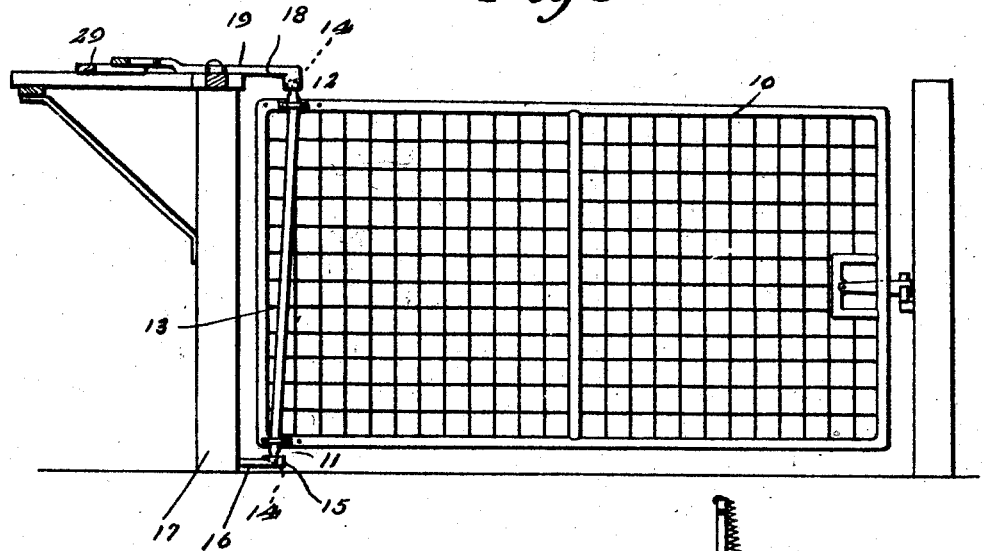
Fig. 4.
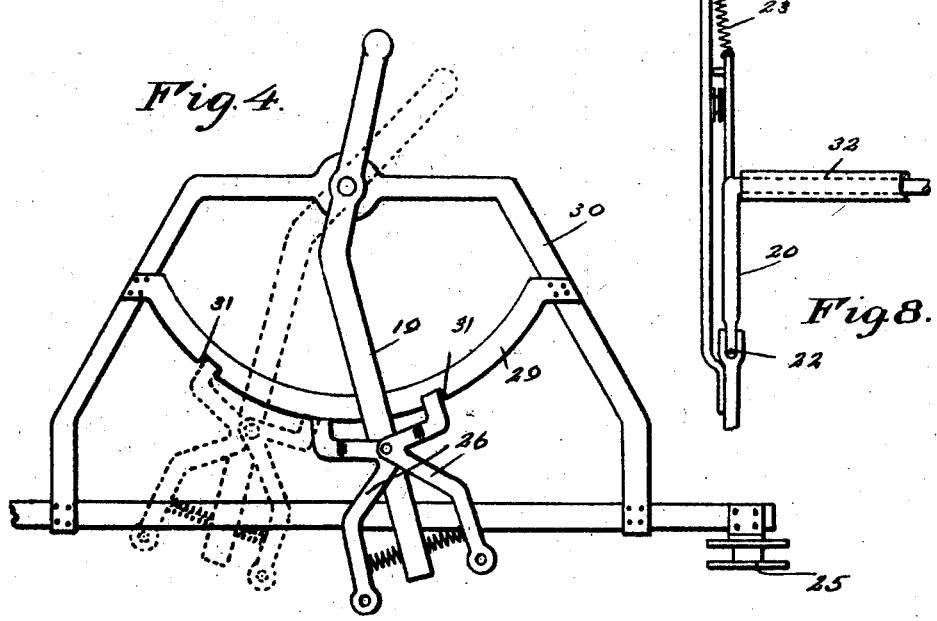
Fig. 8.
H. G. Lane INVENTOR
BY Victor J. Evans ATTORNEY Patented Apr. 28, 1925.

1,535,320

UNITED STATES PATENT OFFICE.

HENRY G. LANE, OF COLQUITT, GEORGIA.

GATE.

Application filed July 6, 1920. Serial No. 394,149.

*To all whom it may concern:*

Be it known that I, HENRY G. LANE, a citizen of the United States, residing at Colquitt, in the county of Miller and State of Georgia, have invented new and useful Improvements in Gates, of which the following is a specification.

This invention comprehends the provision of a self opening and closing gate, the gate being mounted for swinging movement between a fixed pivot and a movable pivot, so that when the latter is moved with respect to the fixed pivot the center of gravity is varied to cause the gate to gravitate to either a closed or open position, this depending upon the direct movement of the movable pivot.

In carrying out the invention, I provide vehicle actuated means for varying the position of the movable pivot, so that the gate can be automatically opened or closed from either side of the gate.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is a transverse sectional view taken on line 3—3 of Figure 2.

Figure 4 is an enlarged fragmentary detail view showing the different positions of the movable pivot.

Figure 5 is an enlarged detail view of the pivoted pawls.

Figure 6 is an enlarged fragmentary detail view of the vehicle actuated means.

Figure 7 is a diagrammatic view, showing the connection between the operating cables and the pivoted pawls.

Figure 8 is a fragmentary view taken at right-angles to Figure 6.

Figure 1:
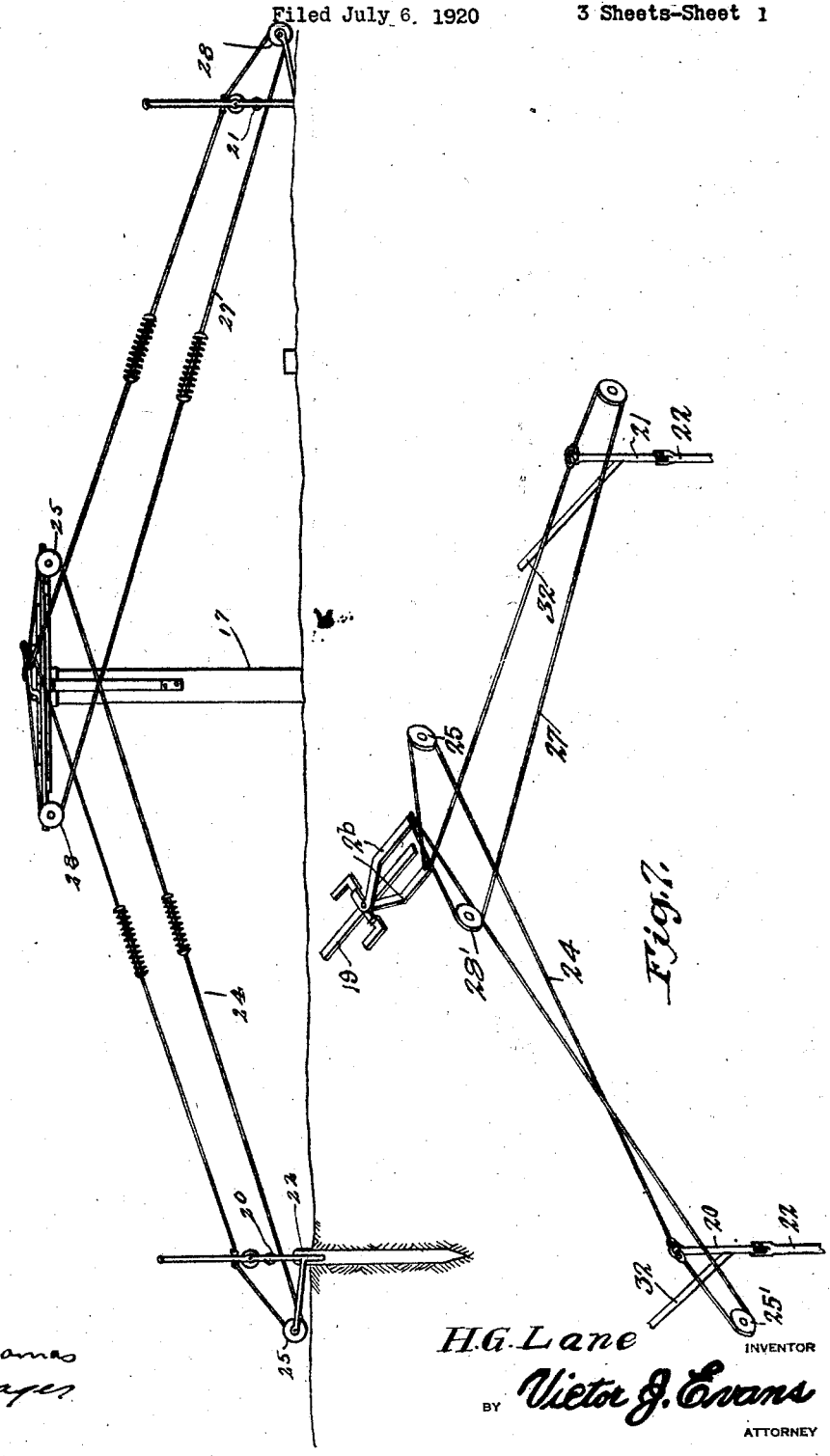
Figure 1 is a side elevation of the mechanism for controlling the movement of the gate.
Figure 2:
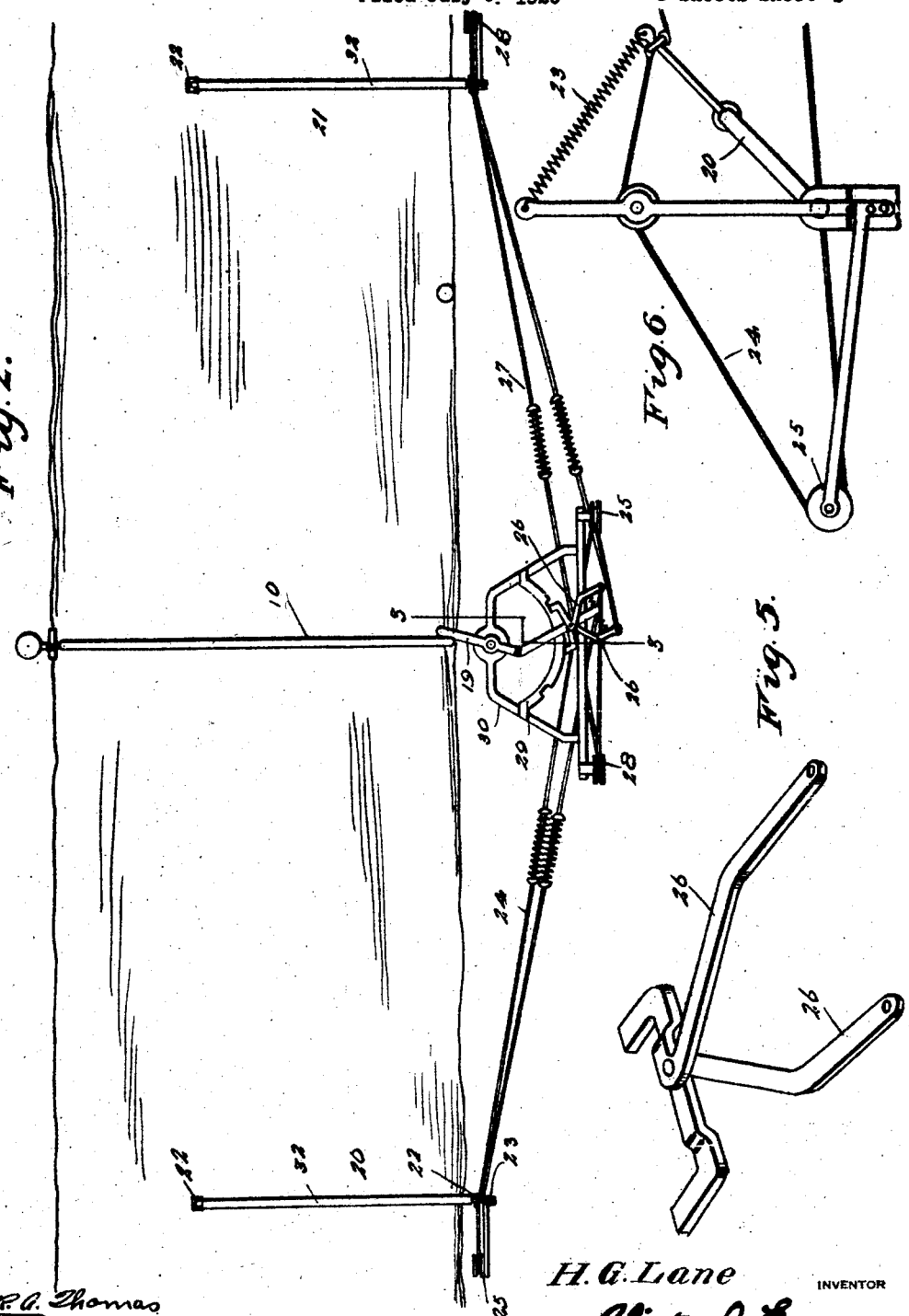
Figure 2 is a top plan view.

Referring to the drawings in detail, 10 indicates a gate which is mounted for swinging movement between a fixed pivot 11 and a movable pivot 12. The gate includes a vertically disposed rod 13 arranged at a slight inclination with respect to the ground having spherical extremities 14, the lowermost of which is received in a socket 15 constituting a fixed pivot. This socket 15 is formed on the terminal of a bolt or other suitable element 16 secured to the gate post 17. The upper bolt and extremity 14 of said rod is received within a socket 18 formed in an angular shaped lever 19 which is fulcrumed at a point between its ends on top of the post 17. Manifestly, when the lever 19 is swung upon its fulcrum in one direction, the movable pivot 12 is adjusted with respect to the fixed pivot, thereby changing the angular position of the gate 10 so that it gravitates to its open position. When the lever 19 is shifted in an opposite direction, the position of parts are changed so that the gate 10 gravitates to a closed position.

For controlling the movement of the lever 19 I provide means including a plurality of vehicle actuated elements disposed at the opposite sides of the gate 10, these elements being of substantially U-shaped formation and indicated at 20 and 21 respectively. Each of these elements is pivoted to a fixed member 22 for swinging movement in opposite directions, but normally maintained in a vertical position through the instrumentality of a spring 23. Terminally secured to the vehicle actuated element 20 is one end of an operating cable 24 which is extended in the direction of and beyond the gate 10 and trained over pulley 25, and then passed through one of a pair of pivoted pawls 26 carried by the lever 19 and having its opposite end secured to the element 21. Terminally secured to the vehicle actuated element 21 is a similar cable 27 which is trained over pulley 28 thence over pulley 28' then passed through the other of the pivoted pawls 26, and thence trained over the pulley 25' and secured to the element 20. These pawls are designed in a manner illustrated in Figure 5, and move across an arcuate shaped bar 29 terminally secured to a frame 30 which is arranged above the gate post 17. The bar 29 is provided at spaced intervals with notches 31 which are alternately engaged by the respective pawls 26 to hold the gate in either of its adjusted positions.

In practice, the vehicle actuated elements 20 and 21 respectively are normally maintained in vertical position by means of the spring 23, and each of these elements is equipped with a roller 32 to prevent the tires of the vehicle from being injured when brought into engagement with said elements. When a vehicle approaches the gate from either side and strikes one of the vehicle actuated elements, the latter is moved inwardly toward the gate exerting a pull upon the said cable connected thereto, this cable in turn releasing one of the pivoted pawls so that the lever 19 may be shifted to change the position of the movable pivot 12 with respect to the fixed pivot 11, thus tilting the gate to a position whereby it automatically gravitates to an open position. As the vehicle passes through the gate opening, and comes in contact with the other of the vehicle actuated elements, the operation of the parts is reversed to close the gate. The construction and arrangement is such that the gate 10 is automatically opened when either of the elements 20 and 21 is moved toward the gate, and the gate automatically closed when either of these elements are moved in a direction away from the gate. As above stated, the spring 23 functions to automatically return the elements 20 and 21 to normal position subsequent to their release from the vehicle.

While it is believed that from the foregoing description the nature and advantages of the invention will be readily apparent, I desire to have it understood that I do not limit myself to the details herein shown and described, and that such changes may be resorted to when desired as fall within the scope of what is claimed.

What is claimed is:

The combination with a gate post and a gate, of a vertically disposed rod secured to said gate at the upper and lower ends thereof, the upper securing point lying in a plane slightly in advance of the lower securing point thereby arranging said rod at a slight inclination with respect to the ground, a fixed socket secured to said post adjacent the lower end thereof, an angular shaped lever pivotally mounted intermediate its ends on the upper surface of said post, a socket provided at one end of said lever, spherical extremities formed on said rod and each extremity adapted to be received in the adjacent socket, a frame supported on the upper end of said post, an arcuate shaped bar terminally secured to said frame and provided at spaced intervals with notches arranged on the outer edge thereof, a pair of pivoted pawls carried by the angular end of said lever and adapted to normally engage the adjacent notch, a pair of pulleys carried by said frame and arranged at opposing points thereon, a fixed member arranged on each side of the gate, a vehicle actuated element pivotally secured to each fixed member, a pulley projecting from each fixed member, a cable one end of which is secured to one vehicle actuated element while the other end is trained over the adjacent pulley thence extending past the nearest pawl and through the other pawl, thence back toward its secured point and trained over one frame pulley and then directed toward the opposite fixed member pulley trained thereover and secured to the opposite vehicle actuated element, a second cable having one end secured to the last mentioned vehicle actuated element and passed through the first mentioned pawl and thence trained over the opposite frame pulley and thence directed toward and secured to the first mentioned vehicle actuated element as and for the purpose specified and spring means for retaining the vehicle actuated elements in a vertical position.

In testimony whereof I affix my signature.

HENRY G. LANE.